US010703143B2

(12) United States Patent
Momozu

(10) Patent No.: US 10,703,143 B2
(45) Date of Patent: Jul. 7, 2020

(54) PNEUMATIC TIRE

(71) Applicant: BRIDGESTONE CORPORATION, Chuo-ku, Tokyo (JP)

(72) Inventor: Masatoshi Momozu, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/387,089

(22) Filed: Apr. 17, 2019

(65) Prior Publication Data

US 2019/0241020 A1    Aug. 8, 2019

Related U.S. Application Data

(63) Continuation-in-part of application No. 14/435,173, filed as application No. PCT/JP2013/077393 on Oct. 8, 2013, now abandoned.

(30) Foreign Application Priority Data

Oct. 17, 2012  (JP) ................. 2012-230193

(51) Int. Cl.
*B60C 11/11* (2006.01)
*B60C 11/12* (2006.01)
*B60C 11/03* (2006.01)

(52) U.S. Cl.
CPC ...... *B60C 11/0302* (2013.01); *B60C 11/0304* (2013.01); *B60C 11/0306* (2013.01); *B60C 11/1218* (2013.01); *B60C 11/1236* (2013.01); B60C 2011/0346 (2013.01); B60C 2011/0355 (2013.01); B60C 2011/0358 (2013.01);

(Continued)

(58) Field of Classification Search
CPC . B60C 11/11; B60C 11/1259; B60C 11/1218; B60C 11/12; B60C 2011/1245; B60C 2011/1213; B60C 2011/1209; B60C 2011/1227; B60C 2011/0313; B60C 5/00
See application file for complete search history.

(56) References Cited

U.S. PATENT DOCUMENTS

2005/0167022 A1   8/2005  Hashimoto
2006/0118222 A1   6/2006  Ebiko
(Continued)

FOREIGN PATENT DOCUMENTS

EP    1520733 A1   4/2005
EP    2014486 A2   1/2009
(Continued)

OTHER PUBLICATIONS

Restriction Requirement issued by USPTO dated Feb. 22, 2017, in related U.S. Appl. No. 14/435,173.
(Continued)

*Primary Examiner* — Steven D Maki
*Assistant Examiner* — Philip N Schwartz
(74) *Attorney, Agent, or Firm* — Solaris Intellectual Property Group, PLLC

(57) ABSTRACT

A pneumatic tire including a block that is partitioned by plural circumferential direction grooves extending along a tire circumferential direction and by plural lug grooves extending diagonally with respect to the tire circumferential direction and provided with two or more bend portions, and at least one inclined fine groove that extends diagonally with respect to the tire circumferential direction, that is provided with at least two bend or more portions inside a single block, and that divides the block.

5 Claims, 10 Drawing Sheets

(52) U.S. Cl.
CPC ............ *B60C 2011/0367* (2013.01); *B60C 2011/1209* (2013.01); *B60C 2011/1213* (2013.01)

(56) References Cited

U.S. PATENT DOCUMENTS

| | | |
|---|---|---|
| 2008/0202658 A1 | 8/2008 | Ikeda et al. |
| 2010/0000642 A1 | 1/2010 | Watabe |

FOREIGN PATENT DOCUMENTS

| | | |
|---|---|---|
| EP | 2287016 A1 | 2/2011 |
| JP | H03-143707 A | 6/1991 |
| JP | H4-365608 A | 12/1992 |
| JP | 2001-246911 A | 9/2001 |
| JP | 2004-345433 A | 12/2004 |
| JP | 2006-151222 A | 6/2006 |
| JP | 2008-201368 A | 9/2008 |
| JP | 2008-213673 A | 9/2008 |
| JP | 2010-221967 A | 10/2010 |
| RU | 2336181 C2 | 10/2008 |
| RU | 2388617 C1 | 5/2010 |
| RU | 2441764 C2 | 2/2012 |
| WO | 2011/111394 A | 9/2011 |

OTHER PUBLICATIONS

Non-Final Office Action issued by USPTO dated Aug. 18, 2017, in related U.S. Appl. No. 14/435,173.
Final Office Action issued by USPTO dated Apr. 5, 2018, in related U.S. Appl. No. 14/435,173.
Advisory Office Action issued by USPTO dated Aug. 28, 2018, in related U.S. Appl. No. 14/435,173.
Non-Final Office Action issued by USPTO dated Oct. 17, 2018, in related U.S. Appl. No. 14/435,173.
Notice of Allowance issued by USPTO dated Jan. 18, 2019, in related U.S. Appl. No. 14/435,173.
Response to the restriction requirement issued by USPTO dated Feb. 22, 2017, in related U.S. Appl. No. 14/435,173.
Response to the Non-Final Office Action issued by USPTO dated Aug. 18, 2017, in related U.S. Appl. No. 14/435,173.
Response to the Final Office Action issued by USPTO dated Apr. 5, 2018, in related U.S. Appl. No. 14/435,173.
Response to the Non-Final Office Action issued by USPTO dated Oct. 17, 2018, in related U.S. Appl. No. 14/435,173.

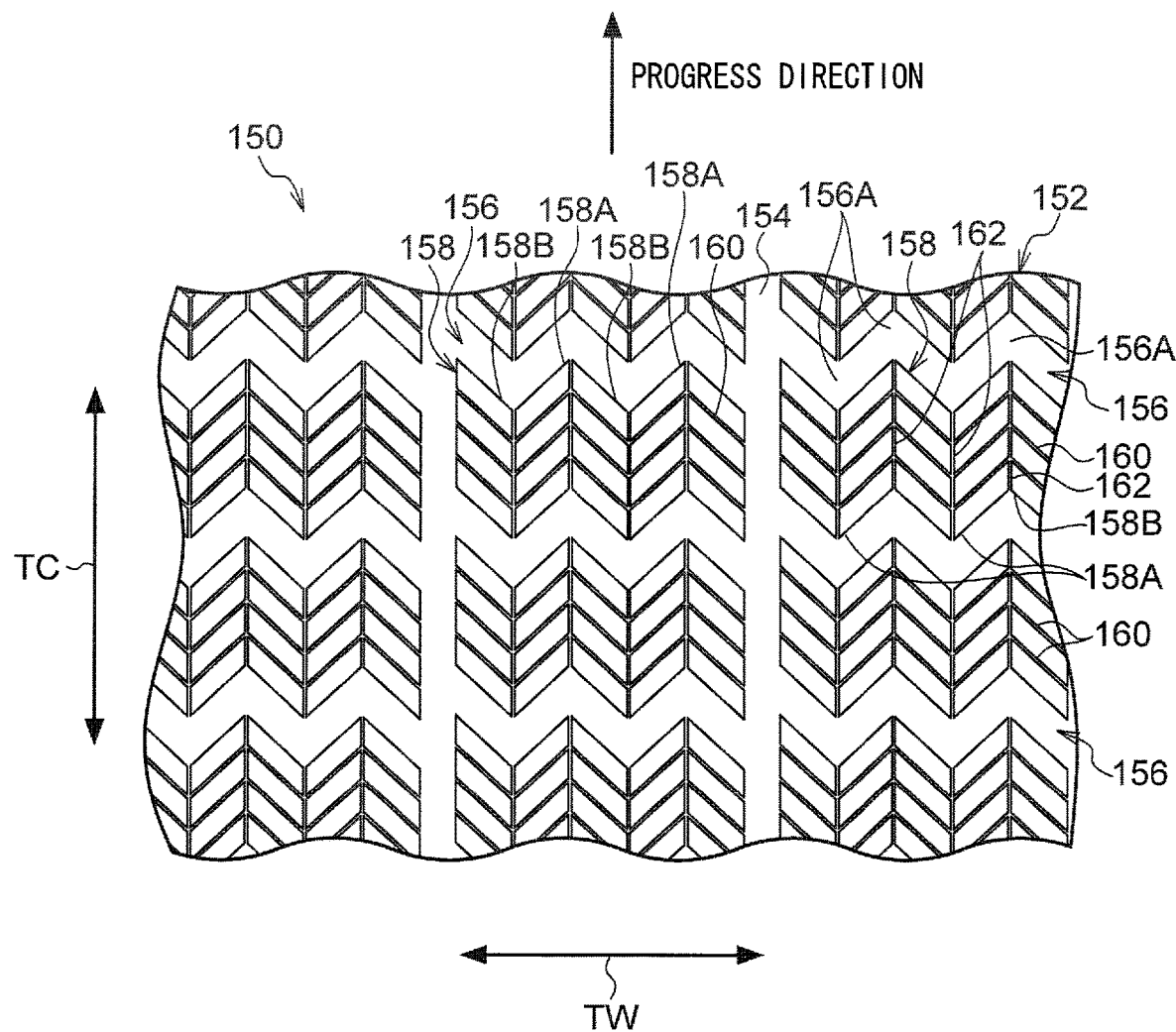

PNEUMATIC TIRE

CROSS-REFERENCE TO RELATED APPLICATION

This application is a continuation-in-part application of, and claims priority to, U.S. application Ser. No. 14/435,173, filed Apr. 13, 2015, which is a national stage application of International Application No. PCT/JP2013/077393, filed Oct. 8, 2013, which claims priority to Japanese Patent Application No. 2012-230193, filed Oct. 17, 2012.

BACKGROUND

Technical Field

The present invention relates to a pneumatic tire with a sipe (a fine groove) formed inside a block.

Background Art

Pneumatic tires exist in which a sipe (a fine groove) is formed in a block partitioned by plural circumferential direction grooves extending along a tire circumferential direction and plural lug grooves extending diagonally with respect to the tire circumferential direction, thereby dividing the block. This type of pneumatic tire includes, in International Publication (WO) 2011/111394, a tire provided with what is referred to an arrow shaped block, in which, from out of the wall faces at the lug groove sides of the block, one wall face forms a protruding shape at a tire circumferential direction side, and the other wall face forms a indented shape at a tire circumferential direction side.

However, it cannot be said yet that driving performance on ice is sufficient, and a pneumatic tire with improved driving performance on ice is desired.

SUMMARY OF INVENTION

Technical Problem

In consideration of the above circumstances, an object of the present invention is to provide a pneumatic tire with improved driving performance on ice.

Solution to Problem

In a pneumatic tire according to a first aspect of the present invention, a block is partitioned by plural circumferential direction grooves extending along a tire circumferential direction and by plural lug grooves extending diagonally with respect to the tire circumferential direction. Edges of wall faces on the lug groove sides of the block thereby catch on an icy road, enabling driving performance on ice to be secured. The block is also formed with an inclined fine groove that extends diagonally with respect to the tire circumferential direction, that is provided with two or more bend portions inside a single block, and that divides the block. Edges of the block divided by the inclined fine groove thereby catch on an icy road, enabling driving performance on ice to be improved.

Two or more bend portions are also formed to each lug groove. The wall faces at the lug groove sides of the block thereby form a protruding and indented shape. Namely, apex portions of protruding shape are formed along the tire circumferential direction, and corner portions of indented shape are formed along the tire circumferential direction. The apex portions and the corner portions are less liable to tilt over when the block kicks off from a road surface due to increased ground contact pressure with respect to the road surface, thereby enabling the catching effect on an icy road to be increased.

A pneumatic tire according to a second aspect of the present invention includes a circumferential direction fine groove extending along the tire circumferential direction inside the block. Meltwater between the block and the road surface thereby enters the inclined fine groove and the circumferential direction fine groove, and is discharged into the circumferential direction grooves and the lug grooves. This enables water discharge efficiency to be increased and anti-hydroplaning performance to be improved compared to a block in which only an inclined fine groove is formed.

In a pneumatic tire according to a third aspect of the present invention, the circumferential direction fine groove is formed with a shallower groove depth than that of the inclined fine groove. The block is thereby less liable to tilt over during kick-off compared to a case in which the groove depth of the circumferential direction fine groove and the groove depth of the inclined fine groove are the same depth, thus enabling a reduction in the ground contact surface area to be suppressed.

In a pneumatic tire according to a fourth aspect of the present invention, the circumferential direction fine groove is formed between the bend portions of the lug grooves adjacent to each other in the tire circumferential direction, and the circumferential direction fine groove thereby links together the bend portions, where meltwater is liable to collect, enabling water discharge performance to be improved.

In a pneumatic tire according to a fifth aspect of the present invention, at least a portion of the inclined fine groove extends in a zigzag shape in a block plan view and is a 3-dimensional sipe that folds in the depth direction of the inclined fine groove. Forming the inclined fine groove with a 3-dimensional profile enables the rigidity of the block to be increased. The block is thereby less liable to tilt over, enabling a reduction in the ground contact surface area to be suppressed.

In a pneumatic tire according to a sixth aspect of the present invention, at least one end portion of the circumferential direction fine groove has a terminal end inside the block. One portion of the block is thereby linked without being divided by the circumferential direction fine groove, enabling the rigidity of the block to be increased compared to a case in which the block is divided.

In a pneumatic tire according to a seventh aspect of the present invention, the bend portions of the lug grooves are formed at an even number of locations, such that the block does not have any directionality. The rotation direction when mounting the tire to a vehicle therefore does not need to be specified, thereby facilitating tire rotation.

In a pneumatic tire according to an eighth aspect of the present invention, the bend portions of the lug grooves are provided at regular intervals between the circumferential direction grooves, and a number N of the bend portions of the lug grooves satisfies equation $W/L \geq N-1$, wherein W is a lateral width of the block in a tire axial direction and L is a vertical width of the block in the tire circumferential direction.

Setting the number of bend portions to satisfy the above equation enables a reduction in the rigidity of the apex portions to be suppressed, without reducing the lateral width of the apex portions of the block. Namely, in a case in which the lateral width W of a block is double the vertical width L, for example, by setting the number N of the bend portions to three or less, rigidity can be secured without reducing the lateral width of the apex portions.

Advantageous Effects of Invention

With the above configuration, the present invention enables provision of a pneumatic tire with improved driving performance on ice.

BRIEF DESCRIPTION OF DRAWINGS

FIG. 10 is an opened-out view illustrating a portion of a tread section of a pneumatic tire according to an eighth exemplary embodiment of the present invention.

DESCRIPTION OF EMBODIMENTS

First Exemplary Embodiment

Tire Configuration

Figure 1:
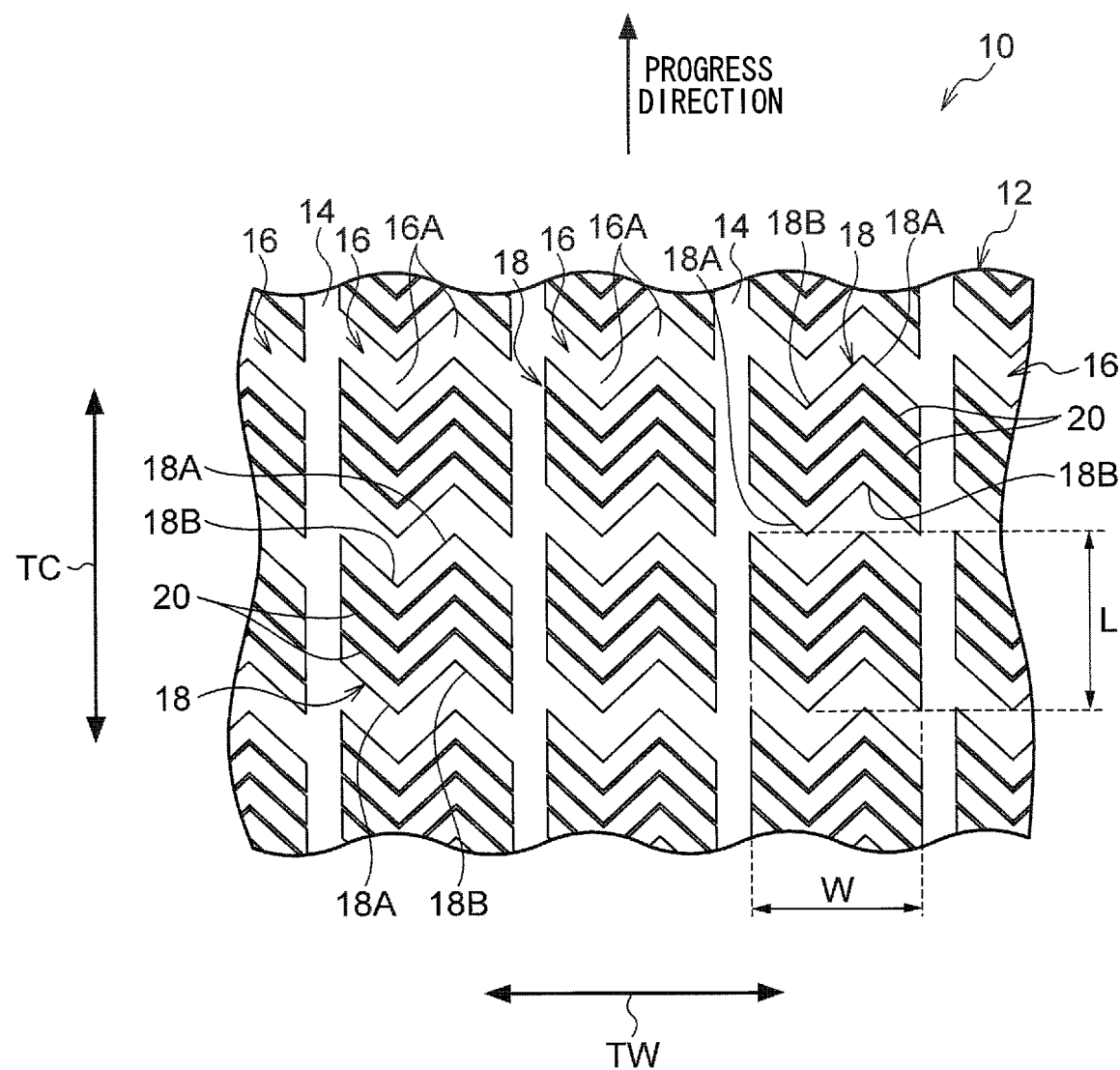
FIG. 1 is an opened-out view illustrating a portion of a tread section of a pneumatic tire according to a first exemplary embodiment of the present invention.

Explanation follows regarding a pneumatic tire 10 (hereafter referred to as a tire 10) according to a first exemplary embodiment of the present invention, with reference to the drawings. Note that in the drawings, the arrow TW indicates the axial direction of the tire 10 (the tire axial direction), and the arrow TC indicates the circumferential direction of the tire 10 (the tire circumferential direction). The tire axial direction referred to herein indicates a direction parallel to a rotation axis of the tire 10, and is also referred to as the tire width direction. The tire circumferential direction refers to the direction in which the tire 10 rotates about the rotation axis of the tire 10. Internal configuration of the tire 10 is similar to that of pneumatic tires in general, and so explanation is omitted.

As illustrated in FIG. 1, plural circumferential direction grooves 14 extending along the tire circumferential direction are formed to a tread section 12 of the tire 10. The circumferential direction grooves 14 are provided at intervals in the tire axial direction. The circumferential direction grooves 14 are formed at regular intervals in the tire axial direction in the present exemplary embodiment as an example; however configuration is not limited thereto, and the circumferential direction grooves 14 may be formed at irregular intervals.

Lug grooves 16 are provided extending diagonally with respect to the tire circumferential direction, between the circumferential direction grooves 14 that are adjacent to each other in the tire axial direction. The lug grooves 16 are formed parallel to each other at intervals in the tire circumferential direction, and adjacent circumferential direction grooves 14 are linked together by the lug grooves 16.

Each of the lug grooves 16 bends at two locations. Namely, two bend portions 16A are formed between each of the adjacent circumferential direction grooves 14. The bend portions 16A are formed at regular intervals between the circumferential direction grooves 14 in the present exemplary embodiment as an example; however configuration is not limited thereto, and the intervals may be irregular, as long as two or more bend portions 16A are formed. Bend angles θ at each of the bend portions 16A are formed as the same angle (see FIG. 2). Note that the bend portion referred to herein is not limited to a portion with a corner such as the lug groove 16 of the present exemplary embodiment, and also includes portions with a smooth curve.

The direction of each lug groove 16 from the circumferential direction groove 14 on the left side toward the circumferential direction groove 14 on the right side extends in sequence toward the diagonal lower right, the diagonal upper right, and the diagonal lower right, with the bend portions 16A interposed in between. However, configuration is not limited thereto, and the lug groove 16 may be formed extending toward the diagonal upper right, the diagonal lower right, and the diagonal upper right in sequence from the left side, or a combination of these configurations may be applied.

Note that it is preferable to set a number N of the bend portions 16A to a value that satisfies equation (1) below, where W is the lateral width in the tire axial direction, and L is the vertical width in the tire circumferential direction of a block 18. Note that the vertical width L refers to a distance between straight lines extending along the tire axial direction, passing through apex portions 18A of the block 18.

$$W/L \geq N-1 \qquad (1)$$

In the present exemplary embodiment, the lateral width W and the vertical width L of the block 18 are formed with the same dimensions, and so the left side of equation (1) equals 1. It is therefore preferable to set the number N of the bend portions 16A to a value of 2 or less. This is to prevent a possibility of reduced rigidity of the apex portions 18A of the block 18, described later, that would arise if the number of the bend portions 16A was 3 or more, such that the bend angle θ was reduced, and the bend portions 16A were sharply pointed.

In the tread section 12, the blocks 18 are partitioned by the circumferential direction grooves 14 and the lug grooves 16. Plural of the blocks 18 are provided in the tire circumferential direction with the lug grooves 16 interposed in between, and the plural blocks 18 are provided in the tire axial direction with the circumferential direction grooves 14 interposed in between. However, configuration is not limited thereto, and for example one block 18 may be disposed alone.

Wall faces at tire circumferential direction sides (the lug groove 16 sides) of each block 18 are formed in protruding and indented shapes running along the lug grooves 16, with the apex portions 18A forming protruding shapes along the tire circumferential direction, and the corner portions 18B forming indented shapes along the tire circumferential direction, provided at both tire circumferential direction sides of the block 18. The block 18 accordingly has an overall external profile of two combined arrow shaped blocks facing opposite directions to each other.

Inclined sipes 20, serving as inclined fine grooves extending diagonally with respect to the tire circumferential direction, are also formed to the block 18. Note that sipe (fine groove) referred to herein indicates a groove with a groove width from 0.3 mm to 1.5 mm, that is narrower than the circumferential direction groove 14 and the lug groove 16.

The inclined sipes 20 extend parallel to the lug grooves 16, linking together the circumferential direction grooves 14. In the present exemplary embodiment, three of the inclined sipes 20 are provided inside each block 18 as an example. The respective inclined sipes 20 are formed at regular intervals in the tire circumferential direction, thus dividing the block 18, and the block 18 is divided into four equal portions by the inclined sipes 20. The inclined sipes 20 are formed with a similar groove depth to the groove depths of the circumferential direction grooves 14 and the lug grooves 16.

Operation

Explanation follows regarding operation of the tire 10 according to the present exemplary embodiment. Since the dynamic friction coefficient of ice is low, driving performance such as braking performance and steering performance is reduced for general vehicle tires when driving on a road surface covered with ice (an icy road). Since the lug grooves 16 partitioning the blocks 18 of the tire 10 of the present exemplary embodiment extend diagonally with respect to the tire circumferential direction, edges of the wall faces at the lug groove 16 sides of the block 18 catch on an icy road when the block 18 kicks off from the road surface, thereby enabling driving performance on ice to be secured. The inclined sipes 20 are also formed in the block 18 extending parallel to the lug grooves 16, such that edges of the block 18 divided by the inclined sipes 20 catch on the icy road, enabling driving performance on ice to be improved.

Figure 2:
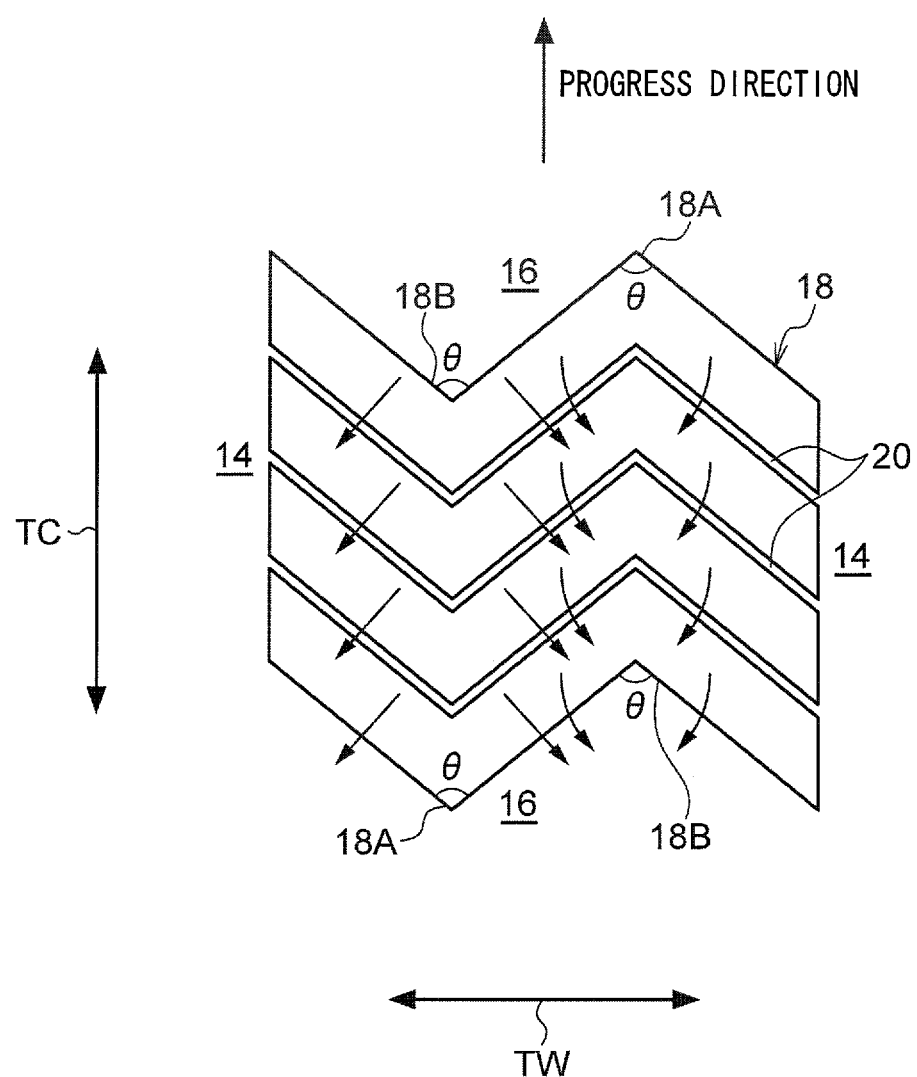
FIG. 2 is an enlarged view of relevant portions, illustrating a state in which a block according to the first exemplary embodiment of the present invention is subject to force from a road surface.
Figure 3:
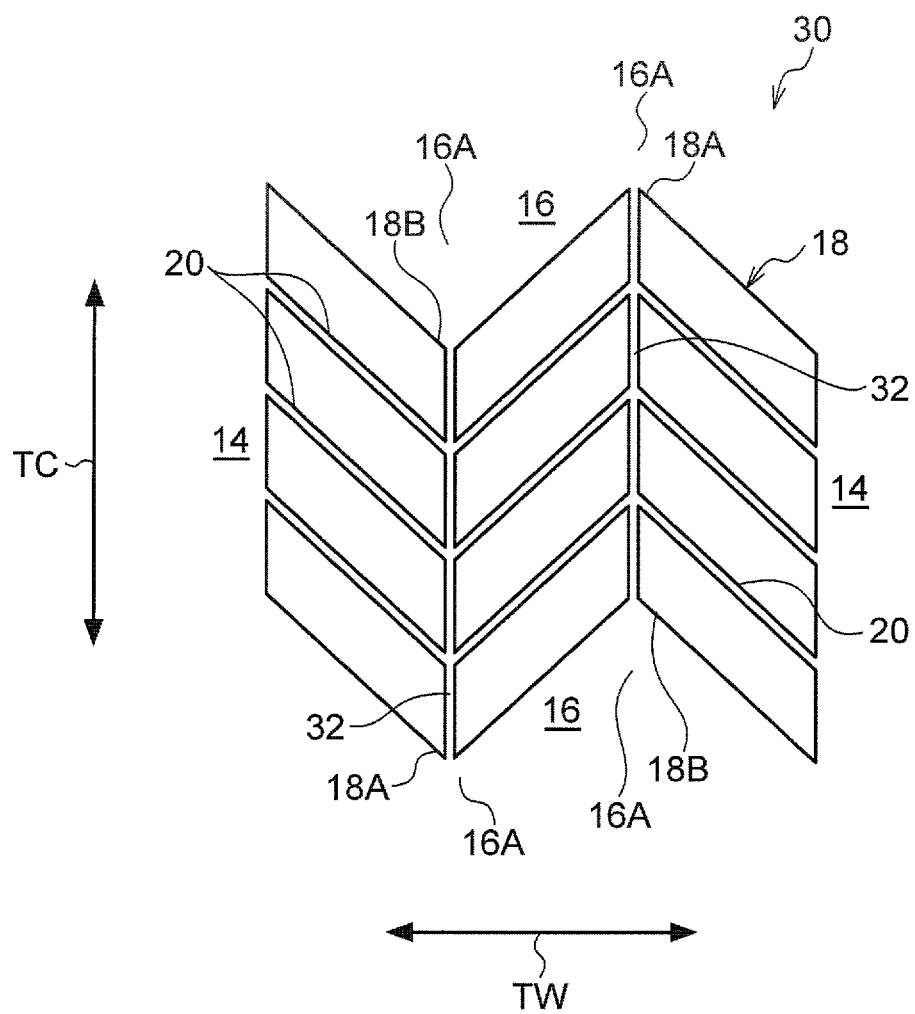
FIG. 3 is an enlarged view of relevant portions, illustrating a block according to a second exemplary embodiment of the present invention.

Since the rigidity of the block 18 is reduced when the block 18 is divided by the inclined sipes 20, there is a concern that the block 18 may tilt over on contact with the road surface, reducing the ground contact surface area. As illustrated in FIG. 2, in the tire 10 of the present exemplary embodiment, the block 18 contacting the road surface bears force from the road surface during kick-off, and deforms so as to tilt over in the direction of the arrows. Namely, in the right half of the block 18 in the drawing, a portion extending from the apex portion 18A toward the progress direction rear side deforms so as to tilt over toward a direction in which the angle θ of the apex portion 18A decreases. The apex portion 18A is thereby suppressed from tilting over, enabling the ground contact pressure of the apex portion 18A to be increased.

In the left half of the block 18 in the drawing, a portion extending from the corner portion 18B toward the progress direction front side deforms so as to tilt over toward a direction in which the angle θ of the apex portion 18A increases. The corner portion 18B is thereby suppressed from tilting over, and the ground contact pressure of the corner portion 18B is increased. Thus, when the blocks 18 are partitioned by the lug grooves 16 provided with two or more bend portions 16A in this manner, the ground contact pressure of the apex portions 18A and the corner portions 18B is increased, enabling a reduction in the ground contact surface area to be suppressed.

Moreover, the inclined sipes 20 of the present exemplary embodiment are formed at regular intervals in the tire circumferential direction, dividing the block 18 into four equal portions, such that rigidity inside the block 18 is less liable to vary, enabling localized wear to be suppressed. Furthermore, meltwater between the road surface and the block 18 enters the inclined sipes 20 and is discharged into the circumferential direction grooves 14, enabling occurrence of a water film to be suppressed.

Although all the blocks 18 have similar dimensions in the present exemplary embodiment, configuration is not limited thereto, and each of the blocks 18 may be formed with different dimensions. Although two bend portions 16A are formed to each of the lug grooves 16 in the present exemplary embodiment, configuration is not limited thereto, and more of the bend portions 16A may be formed. Three bend portions 16A may be formed, for example. However, by forming the bend portions 16A in an even number of locations as in the present exemplary embodiment, there is no directionality of the block 18, and so the rotation direction when mounting the tire to a vehicle does not need to be specified, thereby facilitating tire rotation.

Although three inclined sipes 20 are formed in the present exemplary embodiment, configuration is not limited thereto, and, in consideration of the rigidity of the block 18, the number of inclined sipes 20 therein may be increased to four or more, or the number of inclined sipes 20 may be reduced to two or less. Similar applies for a second exemplary embodiment to an eighth exemplary embodiment below.

Second Exemplary Embodiment

Explanation follows regarding a tire 30 according to the second exemplary embodiment of the present invention. Note that the same reference numerals are applied to similar configuration to that of the first exemplary embodiment, and explanation thereof is omitted. Circumferential direction sipes 32, serving as circumferential direction fine grooves extending parallel to circumferential direction grooves 14, are formed to a block 18. The circumferential direction sipes 32 are formed between bend portions 16A of lug grooves 16, and divide the block 18 by linking apex portions 18A and corner portions 18B of the block 18. The block 18 is thereby divided into 12 equal portions by inclined sipes 20 and the circumferential direction sipes 32.

The groove width of the circumferential direction sipes 32 is formed with a similar width to the groove width of the inclined sipes 20, and the groove depth of the circumferential direction sipes 32 is formed shallower than the groove depth of the inclined sipes 20. In the present exemplary embodiment, the groove depth is formed at approximately half the depth of the inclined sipes 20 as an example.

In the tire 30 of the present exemplary embodiment, meltwater between the road surface and the block 18 passes through the circumferential direction sipes 32 and is discharged into the lug grooves 16, or branches from the circumferential direction sipes 32 into the inclined sipes 20, and is discharged into the circumferential direction grooves 14. Forming the circumferential direction sipes 32 therefore promotes discharge of meltwater between the road surface and the block 18 and suppresses the occurrence of a water film, enabling the occurrence of a hydroplaning phenomenon to be suppressed (enhancing anti-hydroplaning performance).

Although the circumferential direction sipes 32 are formed between the bend portions 16A of the lug grooves 16 in the present exemplary embodiment, configuration is not limited thereto, and the circumferential direction sipes 32 may be formed at other portions. The number of circumferential direction sipes 32 may also be increased, as long as the rigidity of the block 18 is not reduced. In the present exemplary embodiment, the circumferential direction sipes 32 are formed between the bend portions 16A, where meltwater is most liable to collect, thereby increasing water discharge efficiency. One end portion or both end portions of the circumferential direction sipes 32 may have a terminal end inside the block 18. In such a case, a portion of the block 18 is linked together without being completely divided, thereby enabling a reduction in the rigidity of the block 18 to be suppressed.

In the present exemplary embodiment, the groove depth of the circumferential direction sipes 32 is formed shallower than the groove depth of the inclined sipes 20, such that the block 18 is not divided to its base, and a reduction in the rigidity of the block 18 is suppressed. However, configuration is not limited thereto, and the groove depth of the circumferential direction sipes 32 and the groove depth of the inclined sipes 20 may be formed with a similar depth, this being approximately half the groove depth of the circumferential direction grooves 14 and the lug grooves 16.

Third Exemplary Embodiment

Figure 4:
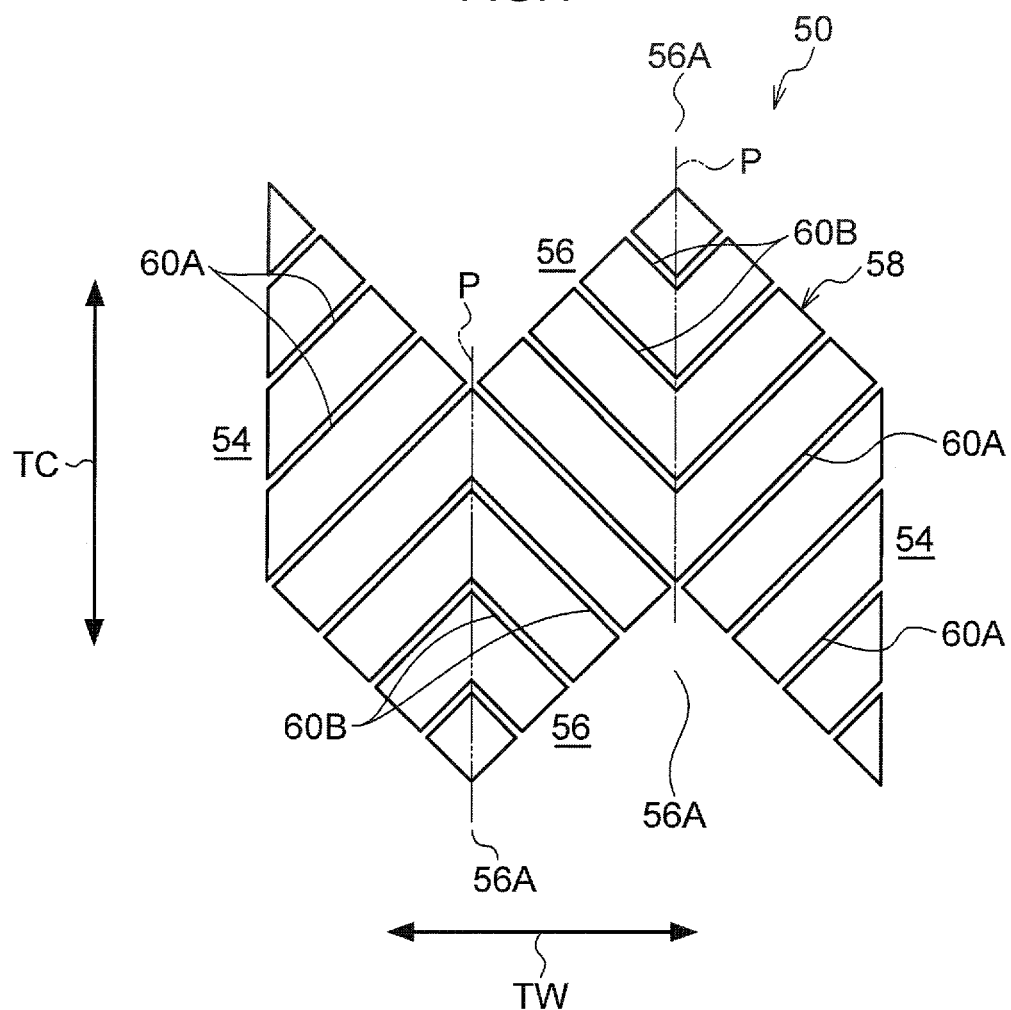
FIG. 4 is an enlarged view of relevant portions, illustrating a block according to a third exemplary embodiment of the present invention.

Explanation follows regarding a tire 50 according to the third exemplary embodiment of the present invention. As illustrated in FIG. 4, the external profile of a block 58 formed to a tread section of the tire 50 of the present exemplary embodiment has a similar profile to the block 18 of the first exemplary embodiment and the block 18 of the second exemplary embodiment, and plural blocks 58 are formed along the tire circumferential direction and the tire axial direction.

Plural inclined sipes 60A, 60B are formed to the block 58 in a direction extending from a lug groove 56 and intersecting with a lug groove 56. The inclined sipes 60A are formed to both tire axial direction sides of the block 58 extending diagonally from the lower left toward the upper right in the drawing. Seven inclined sipes 60A are formed extending parallel to each other from bend portions 56A toward the tire axial direction outside. The inclined sipes 60B are formed to a tire axial direction center portion of the block 58, with seven inclined sipes 60B formed intersecting the inclined sipes 60A and extending parallel to each other from the upper left toward the lower right in the drawing. One end side of each inclined sipe 60B is connected to the respective inclined sipe 60A. Some of the inclined sipes 60A, 60B thereby form respective single inclined sipes that bend at a boundary of a hypothetical line P extending along the tire circumferential direction and passing through the bend portions 56A. The groove depth of the inclined sipes 60A, 60B is a similar depth to the groove depth of circumferential direction grooves 54 and the lug grooves 56.

In the tire 50 of the present exemplary embodiment, since the inclined sipes 60A, 60B extend from the lug grooves 56, discharge efficiency of meltwater collected in the lug grooves 56 can be improved compared to the tire 10 of the first exemplary embodiment, in which the inclined sipes 20 link the circumferential direction grooves 14 to each other.

Note that the numbers of, and intervals between, the inclined sipes 60A, 60B are set in consideration of factors such as the rigidity required of the block 58 and water discharge performance, such that the rigidity of the block 58 is not reduced. Namely, the water discharge performance increases when the number of inclined sipes 60 is increased, and the rigidity of the block 58 increases when the number of the inclined sipes 60A, 60B is reduced.

Fourth Exemplary Embodiment

Figure 5:
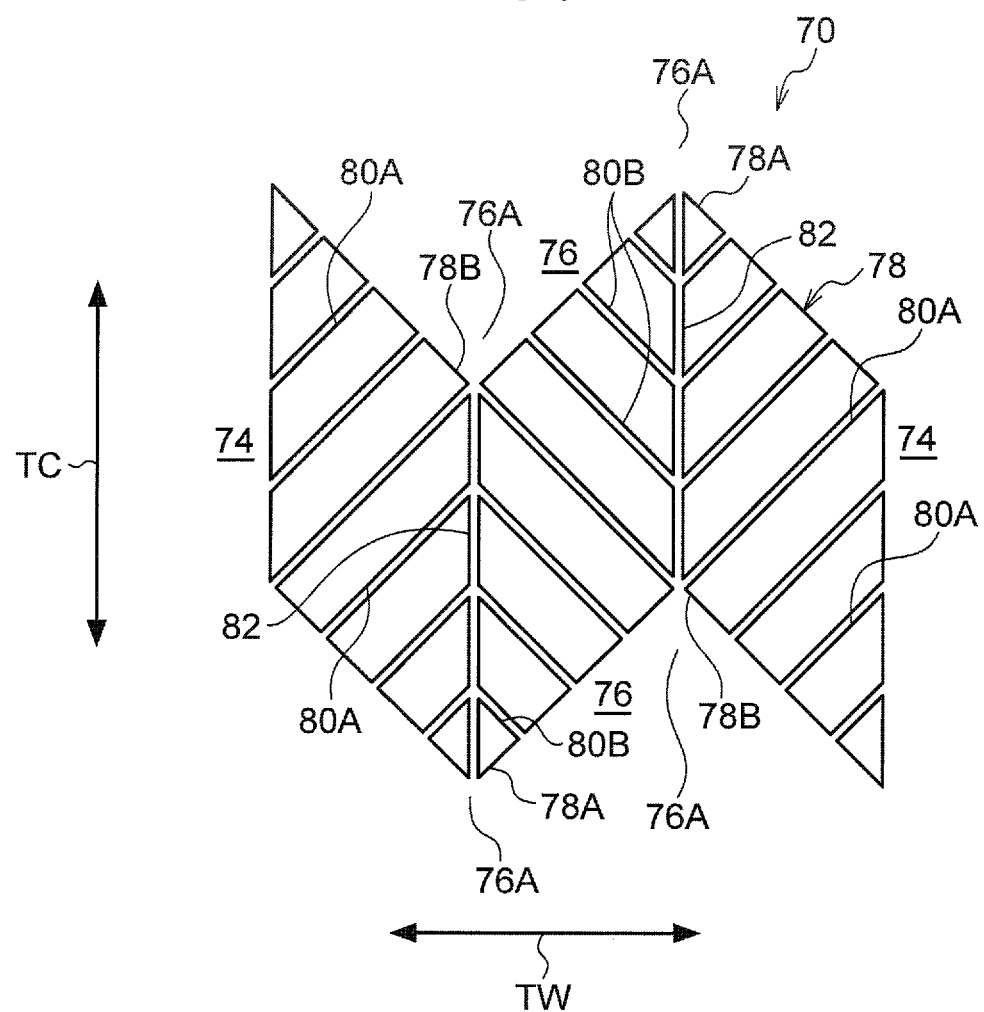
FIG. 5 is an enlarged view of relevant portions, illustrating a block according to a fourth exemplary embodiment of the present invention.

Explanation follows regarding a tire 70 according to the fourth exemplary embodiment of the present invention. As illustrated in FIG. 5, a block 78 is formed to a tread section of the tire 70 of the present exemplary embodiment. The block 78 is partitioned by circumferential direction grooves 74 extending along the tire circumferential direction, and lug grooves 76 extending diagonally with respect to the tire circumferential direction. Two bend portions 76A are provided to each lug groove 76, and apex portions 78A and corner portions 78B are formed to each block 78.

Inclined sipes 80A, 80B are formed to the block 78 extending diagonally with respect to the tire circumferential direction. The groove depth of the inclined sipes 80A, 80B is a similar depth to the groove depth of the circumferential direction grooves 74 and the lug grooves 76. Seven inclined sipes 80A are formed extending parallel to each other at both tire axial direction sides of the block 78, and seven inclined sipes 80B are formed extending parallel to each other at a tire axial direction center portion of the block 78. The positioning and number of the inclined sipes are similar to the third exemplary embodiment.

Circumferential direction sipes 82 are formed to the block 78 extending along the tire circumferential direction. The circumferential direction sipes 82 are formed between the bend portions 76A of the lug grooves 76, and extend along the tire circumferential direction linking the apex portions 78A and the corner portions 78B of the block 78. The groove width of the circumferential direction sipes 82 is a similar width to the groove width of the inclined sipes 80A, 80B, and the groove depth of the circumferential direction sipes 82 is formed shallower than the groove depth of the inclined sipes 80A, 80B. The configuration is otherwise similar to the third exemplary embodiment.

In addition to the operation explained in the third exemplary embodiment, the tire 70 of the present exemplary embodiment enables anti-hydroplaning performance to be improved. Specifically, meltwater between the road surface and the block 78 enters the circumferential direction sipes 82 and is discharged into the lug grooves 76, or branches from the circumferential direction sipes 82 into the inclined sipes 80A, 80B and is discharged in the circumferential direction grooves 74 and the lug grooves 76. Discharge of meltwater between the road surface and the block 78 is thereby promoted and occurrence of a water film is suppressed, enabling anti-hydroplaning performance to be improved.

Fifth Exemplary Embodiment

Figure 6:
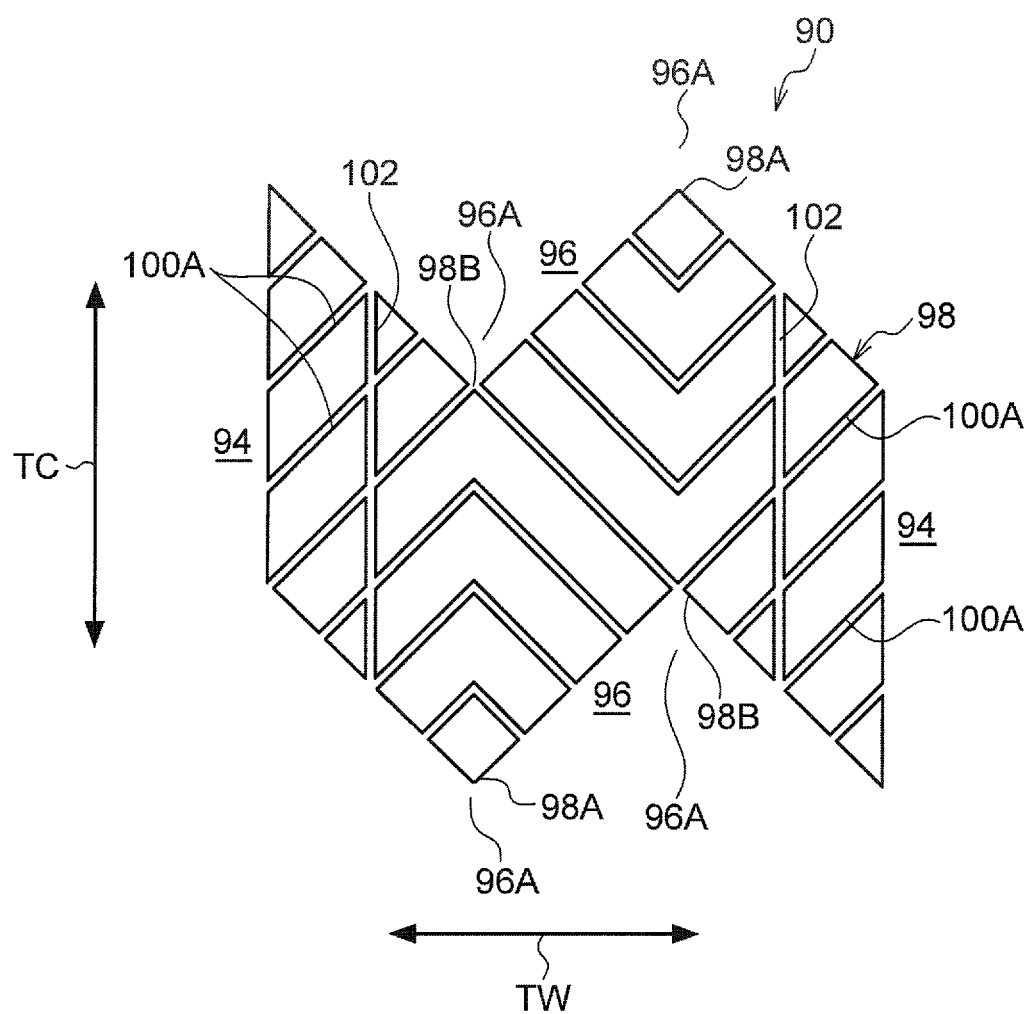
FIG. 6 is an enlarged view of relevant portions, illustrating a block according to a fifth exemplary embodiment of the present invention.

Explanation follows regarding a tire 90 according to the fifth exemplary embodiment of the present invention. As illustrated in FIG. 6, the structure of a block 98 formed to a tread section of the tire 90 of the present exemplary embodiment is similar to the tire 70 of the fourth exemplary embodiment, with inclined sipes 100A, 100B, similar to the inclined sipes 80A, 80B of the fourth exemplary embodiment, formed to the block 98.

Circumferential direction sipes 102 formed to the block 98 are respectively formed between one circumferential direction groove 94 partitioning the block 98 and bend portions 96A, and the other circumferential direction groove 94 partitioning the block 98 and bend portions 96A. Namely, the circumferential direction sipes 102 are formed further toward the tire axial direction outside than the circumferential direction sipes 82 of the fourth exemplary embodiment. In the tire 90 of the present exemplary embodiment, the circumferential direction sipes 102 are separated from apex portions 98A and corner portions 98B, enabling the ground contact surface area of both the apex portions 98A and the corner portions 98B, at which the ground contact pressure is highest, to be secured, and water discharge performance to be improved. Operation is otherwise similar to the fourth exemplary embodiment.

Sixth Exemplary Embodiment

Figure 7:
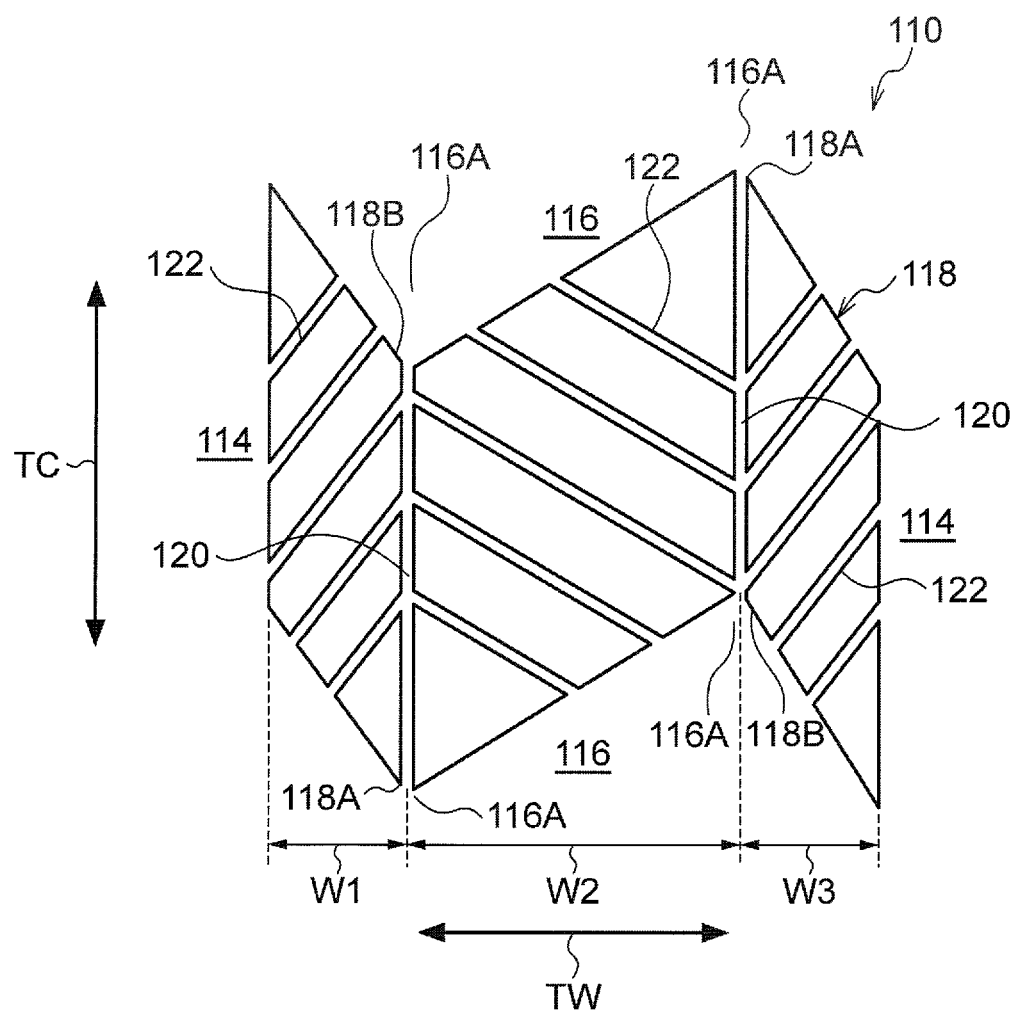
FIG. 7 is an enlarged view of relevant portions, illustrating a block according to a sixth exemplary embodiment of the present invention.

Explanation follows regarding a tire 110 according to the sixth exemplary embodiment of the present invention. As illustrated in FIG. 7, a block 118 formed to a tread section of the tire 110 of the present exemplary embodiment differs from the blocks of the other exemplary embodiments in that bend portions 116A of lug grooves 116 partitioning the block 118 are not formed at regular intervals between circumferential direction grooves 114.

Specifically, the block 118 is partitioned by the circumferential direction grooves 114 extending along the tire circumferential direction and the lug grooves 116 extending diagonally with respect to the tire circumferential direction that are each provided with two bend portions 116A. A length W1 in the tire axial direction from the circumferential direction groove 114 partitioning the block 118 at the left side in the drawing to the nearest bend portion 116A is ½ the length of a length W2 in the tire axial direction between the bend portions 116A. A length W3 in the tire axial direction from the circumferential direction groove 114 at the right side in the drawing to the nearest bend portions 116A is a similar length to W1.

Two circumferential direction sipes 120 are formed to the block 118, extending along the tire circumferential direction. Each circumferential direction sipe 120 is formed between the bend portions 116A of the lug grooves 116, and divides up the block 118 by linking together an apex portion 118A and a corner portion 118B.

Five inclined sipes 122 extending diagonally with respect to the tire circumferential direction are formed to each portion of the block 118, divided by the circumferential direction sipes 120. The five respective inclined sipes 122 are formed parallel to each other at regular intervals. The inclined sipes 122 formed at both end portions in the tire axial direction of the block 118 extend diagonally from the lower left toward the upper right in the drawing, and the inclined sipes 122 formed at a center portion in the tire axial direction of the block 118 extend diagonally from the upper left toward the lower right in the drawing.

Seventh Exemplary Embodiment

Figure 8:
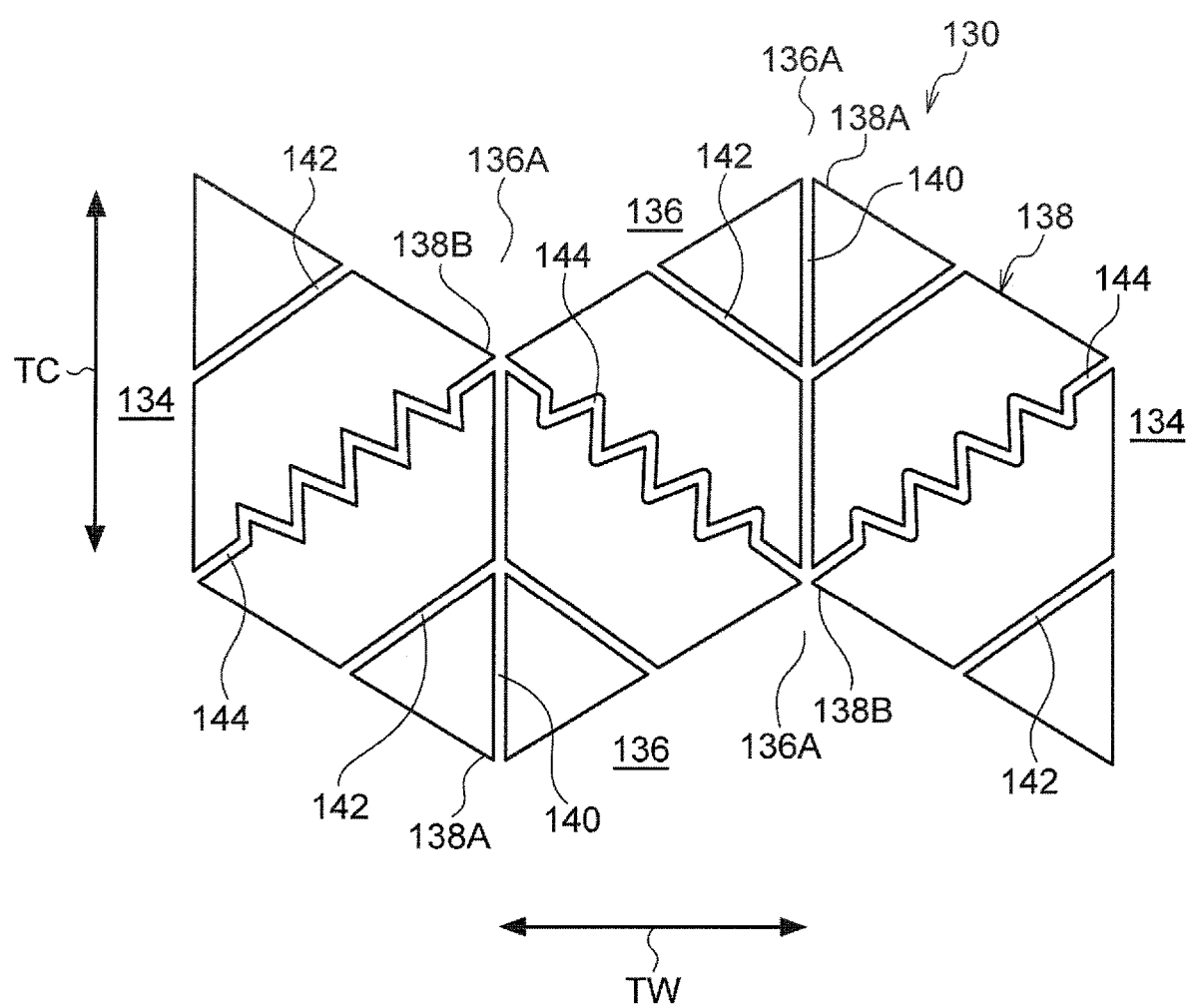
FIG. 8 is an enlarged view of relevant portions, illustrating a block according to a seventh exemplary embodiment of the present invention.

Explanation follows regarding a tire 130 of the seventh exemplary embodiment of the present invention. As illustrated in FIG. 8, a block 138 is formed to a tread section 132 of the tire 130 of the present exemplary embodiment. The block 138 is partitioned by circumferential direction grooves 134 extending along the tire circumferential direction and lug grooves 136 extending diagonally with respect to the tire circumferential direction. Each lug groove 136 bends at two locations, such that apex portions 138A and corner portions 138B are formed to the block 138.

Two circumferential direction sipes 140 are formed to the block 138, extending along the tire circumferential direction between bend portions 136A of the lug grooves 136. The circumferential direction sipes 140 are formed shallower than the circumferential direction grooves 134 and the lug grooves 136, and divide the block 138 by linking together the apex portions 138A and the corner portions 138B of the block 138.

Figure 9:
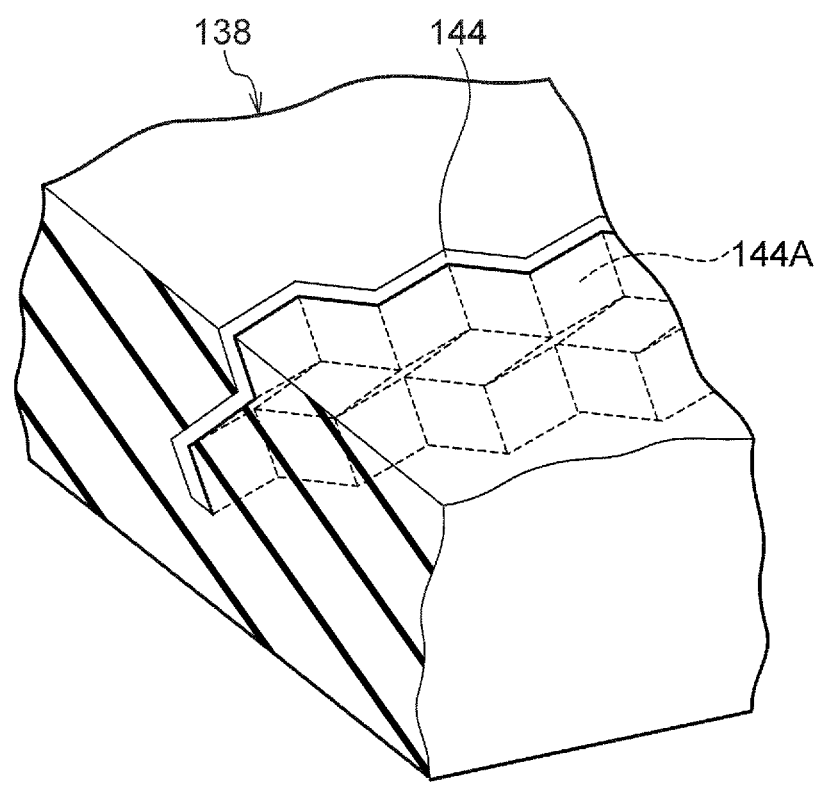
FIG. 9 is a perspective view of a cross-section of a block taken along the depth direction, illustrating a 3-dimensional sipe according to the seventh exemplary embodiment of the present invention.

The block 138, divided by the circumferential direction sipes 140, is further divided into two equal portions by 3-dimensional sipes 144 extending diagonally with respect to the tire circumferential direction. Each 3-dimensional sipe 144 extends in a zigzag shape in a block plan view, and in the present exemplary embodiment, divides the block 138 by bending eight times as an example. As illustrated in FIG. 9, the 3-dimensional sipe 144 also folds in the depth direction to form plural inclined faces 144A. In the present exemplary embodiment, there are two folds in the depth direction and the 3-dimensional sipe 144 is formed to a depth of approximately two thirds of the thickness of the block 138 as an example. Note that the zigzag shape referred to herein indicates a state in which there are folds in two locations.

As illustrated in FIG. 8, inclined sipes 142 are formed to the block 138, extending diagonally with respect to the tire circumferential direction at both sides of the 3-dimensional sipes 144 such that the 3-dimensional sipes 144 are interposed in between. The inclined sipes 142 are formed with a similar groove width to circumferential direction sipes 140, and with a similar groove depth to the circumferential direction grooves 134 and the lug grooves 136.

In the tire 130 of the present exemplary embodiment, forming the sipes in 3-dimensional shapes, as in the 3-dimensional sipes 144, enables the rigidity of the block 138 to be increased. This suppresses the block 138 divided by the 3-dimensional sipes 144 from tilting over, enabling a reduction in the ground contact surface area to be suppressed. In particular, disposing the 3-dimensional sipes 144 in the vicinity of the circumferential direction center of the block 138 as in the present example enables the rigidity of the block 138 to be effectively improved.

Eighth Exemplary Embodiment

Explanation follows regarding a tire 150 according to the eighth exemplary embodiment of the present invention. As illustrated in FIG. 10, a block 158 is formed to a tread section of the tire 150 of the present exemplary embodiment. The block 158 is partitioned by circumferential direction grooves 154 extending along the tire circumferential direction and lug grooves 156 extending diagonally with respect to the tire circumferential direction. Four bend portions 156A are provided to each lug groove 156 and are formed at regular intervals.

Wall faces at the lug groove 156 sides of the block 158 are formed in protruding and indented shapes running along the lug grooves 156. Two apex portions 158A formed in protruding shapes along the tire circumferential direction, and two corner portions 158B formed in indented shapes along the tire circumferential direction, are formed to each tire circumferential direction side of the block 158 in a block plan view. Inclined sipes 160 extending diagonally with respect to the tire circumferential direction are also formed to the block 158. Three inclined sipes 160 are formed running parallel to the lug grooves 156 at regular intervals in the tire circumferential direction.

Four circumferential direction sipes 162 are formed to the block 158 extending along the tire circumferential direction at regular intervals in the tire axial direction. The circumferential direction sipes 162 are formed between the bend portions 156A of the lug grooves 156, and divide the block 158 by linking together the apex portions 158A and the corner portions 158B of the block 158.

In the tire 150 of the present exemplary embodiment, compared to the blocks of the other exemplary embodiments, there is double the number of apex portions 158A and corner portions 158B that particularly increase the ground contact pressure, thereby enabling the catching effect on an icy road to be improved.

Although the inclined sipes 160 are formed parallel to the lug grooves 156 in the present exemplary embodiment, there is no limitation thereto. For example, inclined sipes 160 may be formed to intersect lug grooves 76, similarly to the inclined sipes 80A, 80B of the fourth exemplary embodiment illustrated in FIG. 5.

EXAMPLES

In order to confirm the advantageous effects of tires according to the present invention, a comparison is made of friction coefficients on ice of a total of seven types of tire, these being six types of tire according to exemplary embodiments of the present invention and a tire of a Comparative Example. The test result for the comparison is made by using the FEM simulation. Explanation follows regarding the example tires and the Comparative Example tire used in the test. Note that the tire size of all the tires used is 195/65R15.

Example 1

A tire including the block 18 according to the second exemplary embodiment.

Example 2

A tire including the block 78 according to the fourth exemplary embodiment.

Example 3

A tire including the block 98 according to the fifth exemplary embodiment.

Example 4

A tire including the block 118 according to the sixth exemplary embodiment.

Example 5

A tire including the block 138 according to the seventh exemplary embodiment.

Example 6

A tire including the block 158 according to the eighth exemplary embodiment.

Comparative Example

The tire of the comparative example has seven sipes extending along the tire axial direction formed to each block, which is partitioned by lug grooves extending along the tire axial direction and circumferential direction grooves extending along the tire circumferential direction.

Test contents: Each tire is assembled in a new state to a suitable rim as specified by JATMA (JATMA YEAR BOOK, 2012) and filled with air until reaching a suitable internal pressure specified by JATMA. Then, in a state of being pressed against a rotating drum of drum test equipment simulating an icy road and applied with a radial load of 528 kgf (5.18 kN), each tire is driven at 30 km/h, the stress acting on each tire is measured, and a friction coefficient is computed using the measured value. Table 1 is a summary of the test results. Note that in Table 1, the friction coefficient is indicated as an index with the Comparative Example set at 100, with a higher value index indicating a larger friction coefficient and a higher performance on ice.

TABLE 1

|  | Comparative Example | Example 1 | Example 2 | Example 3 | Example 4 | Example 5 | Example 6 |
| --- | --- | --- | --- | --- | --- | --- | --- |
| Friction Coefficient (Index) | 100 | 105 | 110 | 108 | 108 | 120 | 130 |

The test results in Table 1 can confirm that all the examples have a higher performance on ice than the Comparative Example. The test results can also confirm that the tire of Example 5 (the seventh exemplary embodiment) and the tire of Example 6 (the eighth exemplary embodiment) have particularly high performance on ice. It is conceivable that, since the tire of Example 5 is formed with the 3-dimensional sipes 144 as illustrated in FIG. 9, the rigidity of the blocks 138 is increased and the blocks 138 are less liable to tilt over, thereby increasing the advantageous effect of catching on an icy road. It is also conceivable that, as illustrated in FIG. 10, the ground contact surface area of the tire of Example 6 has increased by the amount of increase in the lateral width in the tire axial direction of the blocks 158 compared to the other exemplary embodiments.

Although the first to the eighth exemplary embodiments of the present invention have been explained above, the present invention is not limited to these exemplary embodiments, and obviously various modifications may be implemented within a range not departing from the spirit of the invention. For example, the blocks according to the first to the seventh exemplary embodiments may be formed to part of, or all of, the tread section 12 of the tire 10 illustrated in FIG. 1.

EXPLANATION OF THE REFERENCE NUMERALS

10 tire
14 circumferential direction groove
16 lug groove 16A bend portion
18 block
20 inclined sipe (inclined fine groove)
32 circumferential direction sipe (circumferential direction fine groove)
144 3-dimensional sipe
L vertical width
W lateral width

The invention claimed is:

1. A pneumatic tire, comprising:
a block that is partitioned by a plurality of circumferential direction grooves extending along a tire circumferential direction and by a plurality of lug grooves extending diagonally with respect to the tire circumferential direction and provided with two or more bend portions; and
at least one inclined fine groove that extends diagonally with respect to the tire circumferential direction, that is provided with two or more bend portions inside the block, and that divides the block;
the pneumatic tire further comprising two or more circumferential direction fine grooves extending along the tire circumferential direction inside the block so as to partition the block and having a same groove width as the inclined fine groove, wherein
the circumferential direction fine grooves are disposed so as to intersect with bend portions of the inclined fine groove, the bend portions being next to each other along a tire axial direction within the block, and each circumferential direction fine groove being formed only between the bend portions of the lug grooves adjacent to each other in the tire circumferential direction, and wherein
the circumferential direction fine groove is formed with a shallower groove depth than the inclined fine groove.

2. The pneumatic tire of claim 1, wherein at least a portion of the inclined fine groove extends in a zigzag shape in block plan view and is a three-dimensional sipe that zigzags in a depth direction of the inclined fine groove.

3. The pneumatic tire of claim 1, wherein at least one end portion of the circumferential direction fine groove has a terminal end inside the block.

4. The pneumatic tire of claim 1, wherein the bend portions of the lug grooves are formed at an even number of locations.

5. The pneumatic tire of claim 1, wherein:
the bend portions of the lug grooves are provided at regular intervals between the circumferential direction grooves; and
a number N of the bend portions of the lug grooves satisfies the equation $W/L \geq N-1$,
wherein W is a lateral width of the block in a tire axial direction and L is a vertical width of the block in the tire circumferential direction.

* * * * *